May 17, 1932. N. B. CHACE 1,859,025
TILTING TABLE
Filed Nov. 8, 1927 2 Sheets-Sheet 2
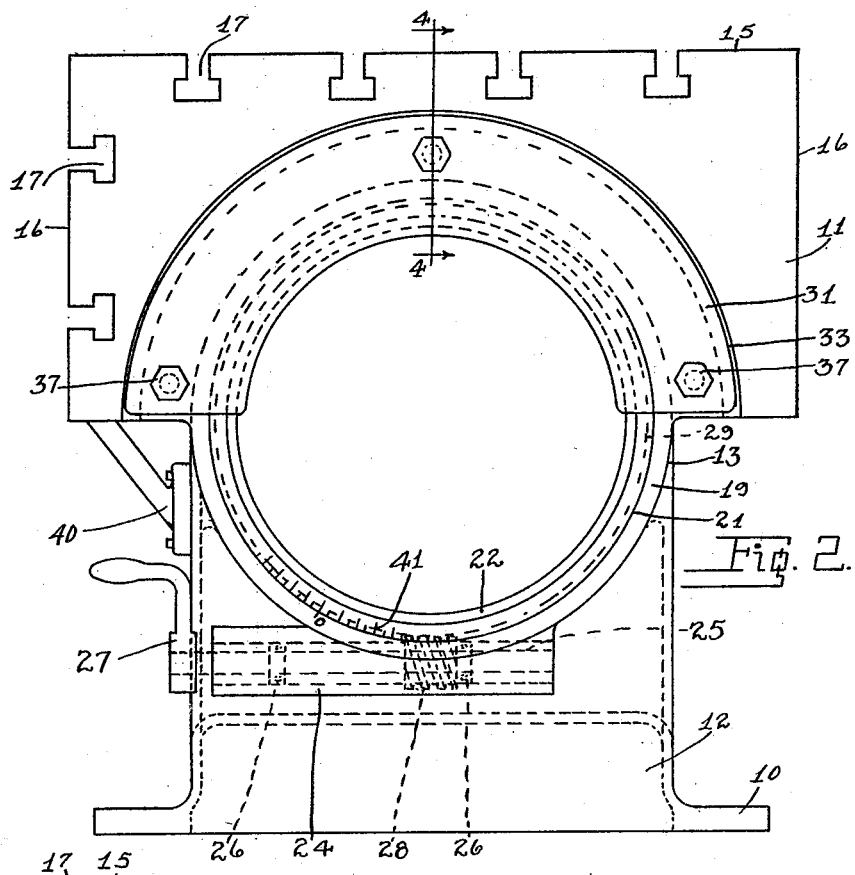
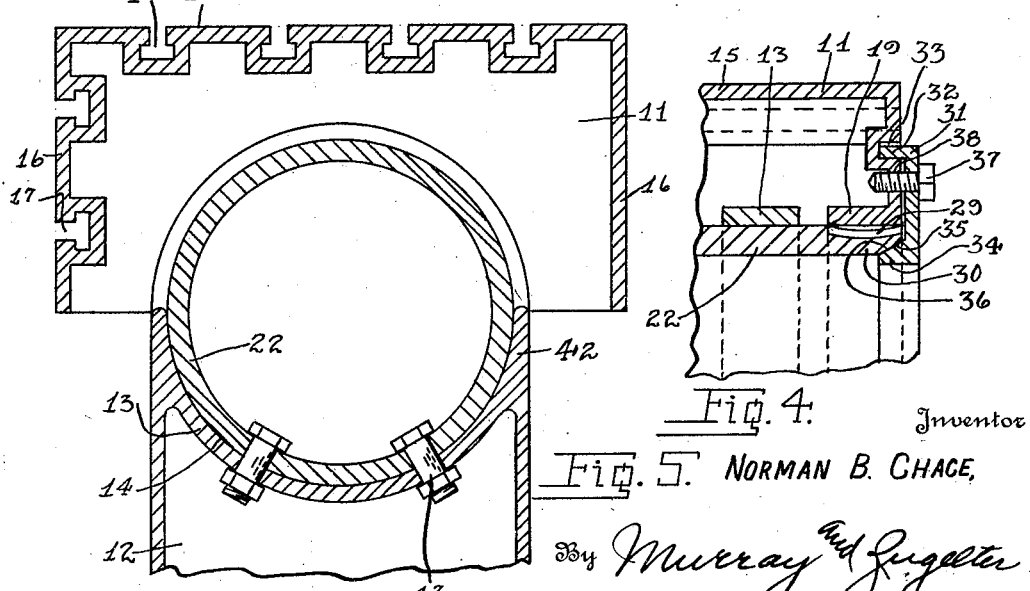
Inventor
NORMAN B. CHACE,
By Murray and Zugelter
Attorneys Patented May 17, 1932

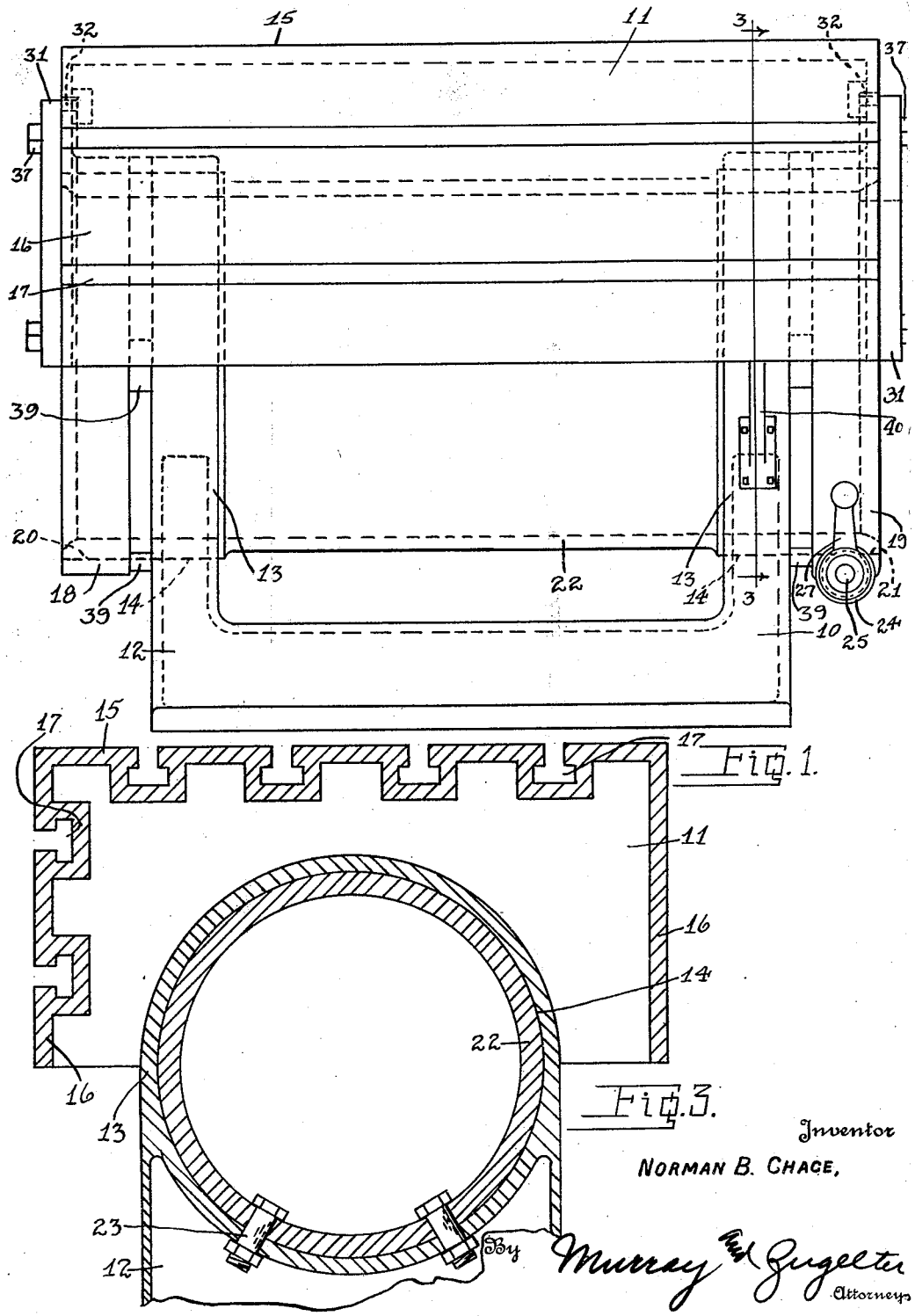

1,859,025

UNITED STATES PATENT OFFICE

NORMAN B. CHACE, OF CINCINNATI, OHIO, ASSIGNOR TO THE FOSDICK MACHINE TOOL COMPANY, OF CINCINNATI, OHIO, A CORPORATION OF OHIO

TILTING TABLE

Application filed November 8, 1927. Serial No. 231,976.

This invention relates to improvements in and to a method of manufacturing a tilting table for use with machine tools, such as radial drills, et cetera.

An object of this invention is to provide a sturdy tilting table that may be easily and rigidly clamped at any angle.

Another object of this invention is to provide a rigid tilting table having the bearing member secured to the stand and the table member movable on said fixed bearing member.

Another object of this invention is to provide a clamp for securing the relatively movable members of a tilting table to one another after they have been adjusted.

Another object of this invention is to provide a method of manufacture for tilting tables wherein the stand and movable table member are more easily machined and assembled than by the methods used heretofore.

Another object of this invention is to provide a method of manufacturing tilting tables that is less expensive than the methods used heretofore and wherein the matching is done more accurately because the stand and movable table members are integral until matched.

These and other objects are attained by the means described herein and disclosed in the accompanying drawings, in which:

Fig. 1 is a side elevation of the improved tilting table.

Fig. 2 is an end elevation of the device shown in Fig. 1.

Fig. 3 is a sectional view taken on line 3—3 of Fig. 1.

Fig. 4 is a sectional view taken on line 4—4 of Fig. 2.

Fig. 5 is a fragmental sectional view, similar to Fig. 3, showing a modification of the invention.

The device of this invention comprises a stationary or fixed stand 10 and a movable table member 11. The stand 10 is provided with a base 12 from which extend a pair of ring-like bearings 13 having aligned bores 14 formed therein.

The movable member 11 may be of rectangular shape, having a top 15 and sides 16, with T-shaped slots 17 therein for receiving bolts or the like by which work or the like is secured to the top and side of the table. The table 11 is hollow and is provided at its opposite ends with ring-like members 18 and 19. The members 18 and 19 are provided with bores 20 and 21 in alignment with the bores 14 formed in the bearing members 13. A cylindrical sleeve or barrel 22 is received in the aligned bores 14, 20 and 21.

The sleeve or barrel 22 is secured to the bearing members 13 by means of bolts 23 or the like, see Fig. 3. The forward bearing ring 19 has formed integrally therewith a cylindrical lug 24 in which a shaft 25 is journaled. The shaft 25 is received in suitable ball bearings 26 which are secured in the bore formed in the lug 24. The shaft 25 also carries at its one end a lever 27 and intermediate its ends a worm 28. The teeth of the worm 28 mesh with the teeth 29 formed around the forward end 30 of the sleeve or barrel 22.

A clamp plate 31 of a semi-circular contour is provided on each end of the table for clamping the sleeve or barrel 22 and the ring members 18 and 19 of the movable table 11. The clamp plates and associated members are alike on both sides of the table wherefore a description of one will be sufficient for the both. The clamp plate 31 is provided on its one edge with an outer peripheral flange 32 which is received in a groove or way 33 formed in one end of the movable table. The other edge of the clamp plate 31 has an inner peripheral flange 34 provided with a beveled face 35. The beveled face 35 co-operates with a complementary beveled face 36 on the outer end of the sleeve or barrel 22. Suitable clamping bolts 37 extend through the plate 31 and are received in threaded perforations 38 formed in the end of the movable table 11.

The method of manufacturing this table consists in casting the stand 10 and movable table 11 integral with one another, the parts being held together by means of lugs 39 connecting ring bearing members 13, carried by the stand, and the bearing members 18 and 19, carried by the table, see Fig. 1. After this integral casting is made the bores 14, 20 and 21 are machined at one operation and the sleeve or barrel 22 fitted in the said bores. The sleeve or barrel is then removed and the lugs 39 milled out or removed thereby separating the movable table from the stand. After the sleeve or barrel has been fitted to the table and stand the worm teeth 29 are formed in the forward end thereof. The barrel is then secured to the stand so as to remain stationary with the stand. The worm shaft 25 and worm 28 are then mounted in place with the teeth of the worm 28 meshed with the teeth on the sleeve or barrel 22.

The pair of clamp plates are initially cast as a single ring which is machined as a unit and then cut in two along a diameter to provide the two clamp plates.

From the foregoing it will be noted that perfect alignment of parts is obtained in a minimum of time. The method heretofore employed has been to cast the members of the table separately, bore them separately and to then mount them on an axle. Clamping is usually effected between the body of the table and the leg of the stand.

The tilting tables now generally used have a tendency to spring when pressure is applied to the table member.

After the tilting table has been matched and assembled the clamp plates 31 are mounted in place and the clamping bolts 37 loosely screwed to the table. When it is desired to rotate the table 11 around the sleeve 22 the crank 27 is actuated in the proper direction to rotate the worm 28. The worm shaft 25, worm 28, crank 27, and table move as a unit about the sleeve 22. A suitable stop 40 may be secured to one side of the stand 10 to limit the movement of the table around the sleeve 22 in one direction. The forward end of the sleeve may be provided with suitable indicia 41 to enable the operator to accurately adjust the table to any desired angle.

The modified form of table, shown in Fig. 5, has the upper half of the bearing members 13 cut off to form the bearing members 42 carried by the base 10. The bearing barrel or sleeve 22 is secured to the bearing members 42 by means of bolts or the like 43. It should be noted that the table as shown in Fig. 5 is expeditiously made by first casting and machining the table and stand as described above in regard to the table illustrated in Figs. 1 to 4 inclusive. After the barrel has been matched to the stand and movable table the said stand and table are separated from one another; then the upper part of the bearing rings are removed. By forming the bearing members as shown in Fig. 5 assembly of the complete table is greatly facilitated without sacrificing the advantages of an integrally cast and matched tilting table. By securing the bearing barrel or sleeve to the base and actuating the table member about this bearing sleeve a strong, firm bearing is provided so that the tendency of the table to spring under a load is eliminated. From this it will follow that more accurate results may be obtained from a tilting table of this invention than from the tables now generally employed.

The clamping means used at each end of this device prevent slipping of the table about the bearing barrel or sleeve when pressure is applied to the table member.

What is claimed is:

1. A tilting table for use with machine tools comprising a stand having a pair of bearing members, a movable table having a pair of ring-like bearing members, in axial alignment with the bearing members of the stand, a sleeve received in the bores in the bearing members, the sleeve being fixed in the bearing members in the stand, cooperating means carried by the sleeve and one of the bearings of the movable table for moving the table relative to the stand, and means comprising semi-circular clamping plates and bolts to effect circumferential binding independently at each end of the sleeve for securing the table in adjusted positions upon the sleeve.

2. A tilting table for use with machine tools comprising a pair of relatively movable members, one of the members constituting the stand and the other member constituting the table, spaced apart bearings carried by the members having aligned bores therein, a sleeve extending through the aligned bores and secured to one of the members, co-operating means carried by the sleeve and one of the relatively movable members for adjusting one of the members relative to the other, and independent peripheral clamping means for securing the members to one another at each end in adjusted positions.

3. A tilting table comprising a table having spaced integral bearing rings, a base having spaced integral bearing rings disposed between the rings on the table, a tubular bearing member extending through all of said rings and fixed to the rings on the base and semi-circular clamping plates adapted to be moved into binding relation to the table and the inner face of the tubular bearing.

4. In a tilting table the combination of a stationary member and a slotted movable member movable on and relative to the stationary member, the stationary member comprising a sleeve provided with a bore and a clamping face at the end of the bore, a semicircular clamping plate having a lug thereon received in the slot in the movable member, a clamping face formed on the clamping plate, and means carried by the table for bringing the clamping faces into clamping engagement with one another.

In testimony whereof, I have hereunto subscribed my name this 20th day of October, 1927.

NORMAN B. CHACE.